(12) United States Patent
Takeuchi

(10) Patent No.: US 9,945,459 B2
(45) Date of Patent: Apr. 17, 2018

(54) SWITCH STRUCTURE

(71) Applicant: KABUSHIKI KAISHA TOKAI RIKA DENKI SEISAKUSHO, Aichi (JP)

(72) Inventor: Motoya Takeuchi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 47 days.

(21) Appl. No.: 15/081,960

(22) Filed: Mar. 28, 2016

(65) Prior Publication Data

US 2016/0298738 A1 Oct. 13, 2016

(30) Foreign Application Priority Data

Apr. 10, 2015 (JP) .................................. 2015-081031

(51) Int. Cl.
| | |
|---|---|
| *H01H 23/14* | (2006.01) |
| *F16H 21/44* | (2006.01) |
| *H01H 23/16* | (2006.01) |
| *F16H 21/04* | (2006.01) |
| *H01H 21/22* | (2006.01) |

(52) U.S. Cl.
CPC ............. *F16H 21/44* (2013.01); *F16H 21/04* (2013.01); *H01H 23/14* (2013.01); *H01H 23/168* (2013.01); *H01H 2021/225* (2013.01); *H01H 2300/01* (2013.01)

(58) Field of Classification Search
CPC ...... H01H 3/62; H01H 23/143; H01H 1/5833; H01H 2221/016; H01H 23/168; H01H 13/14; H01H 1/403; H01H 2021/225; H01H 3/04
USPC ..... 200/553, 16 C, 244, 336, 339, 433, 315, 200/437, 517, 556, 558, 559, 562
See application file for complete search history.

(56) References Cited

U.S. PATENT DOCUMENTS

| | | | |
|---|---|---|---|
| 6,005,201 A | 12/1999 | Tanaka et al. | |
| 6,459,060 B1 | 10/2002 | Bartok | |
| 2003/0010612 A1 | 1/2003 | Mihara | |
| 2004/0055863 A1 | 3/2004 | Huang | |
| 2010/0219055 A1 | 9/2010 | Wada et al. | |

FOREIGN PATENT DOCUMENTS

| | | |
|---|---|---|
| CN | CN1393894 A | 1/2003 |
| JP | 7-22435 U | 4/1995 |

OTHER PUBLICATIONS

Extended European Search Report dated Aug. 11, 2016 issued in the application No. 16163144.5.
Office Action of Chinese application No. 201610210747.9 dated Aug. 1, 2017 with its English machine translation.

*Primary Examiner* — Ahmed Saeed

(57) ABSTRACT

A switch structure includes a lever operable by a user, a body coupled to the lever, a support formed in the lever, a pusher supported by the support, a detent surface formed in the body to produce a click when the lever is operated, and a spring that pushes the pusher against the detent surface. The pusher includes two slide surfaces, which slide on the lever and the body, and a groove, which draws grease from one of the two slide surfaces where the grease is applied to another one of the two slide surfaces.

7 Claims, 2 Drawing Sheets

Grease Application Process
Performed at Single Location
・Slide Surface of Pusher and Body Grease Application Process
Performed at Two Locations
・Slide Surface of Pusher and Lever
・Slide Surface of Pusher and Body

SWITCH STRUCTURE

CROSS-REFERENCE TO RELATED APPLICATIONS

This application is based upon and claims the benefit of priority from prior Japanese Patent Application No. 2015-081031, filed on Apr. 10, 2015, the entire contents of which are incorporated herein by reference.

FIELD

This disclosure relates to a switch structure.

BACKGROUND

Japanese Laid-Open Utility Model Publication No. 7-22435 describes a switch structure that produces a click when a lever is operated.

As illustrated in FIG. 4, the switch structure includes a lever 34 that is operable by a user. Further, the switch structure includes a body 31, a spring 32, and a pusher 33. The body 31 includes a detent surface, and the spring 32 forces the pusher 33 against the detent surface. The pusher 33 is initially held at a neutral position illustrated in FIG. 4. The pusher 33 and the spring 32 are supported by the lever 34. When the lever 34 is operated, the pusher 33 is moved along the detent surface of the body 31. When the pusher 33 moves over a ridge of the detent surface, a click is produced and transmitted to the lever 34 so that the user perceives the click. When the lever 34 is released, the pusher 33 returns to the neutral position.

The pusher 33 includes a slide surface that slides along the body 31 (detent surface) and a slide surface that slides along the lever 34. In this structure, grease is applied to the surfaces where the pusher 33 and the body 31 slide relative to each other and the surfaces where the pusher 33 and the lever 34 slide relative to each other. This enables smooth movement (sliding) of the pusher 33.

In the switch structure of FIG. 4, the application of grease is performed at two locations. This increases the manufacturing cost.

SUMMARY

It is desirable that the number of times grease application is performed, that is, the number of locations that undergo grease application process be reduced to improve efficiency and lower costs.

One aspect of a switch structure includes a lever operable by a user, a body coupled to the lever, a support formed in one of the lever and the body, a pusher supported by the support, a detent surface formed in the other one of the lever and the body to produce a click when the lever is operated, and a spring that pushes the pusher against the detent surface. The pusher includes at least two slide surfaces that slide on the lever and the body. The pusher includes a groove that draws grease from one of the at least two slide surfaces where the grease is applied to another one of the at least two slide surfaces.

In this structure, grease spreads from one of the slide surfaces where the grease is applied to another one of the slide surfaces. This applies grease to each slide surface and enables the pusher to move smoothly. Accordingly, the number of locations where grease is applied is reduced without affecting the performance of the switch structure.

Other aspects and advantages of the embodiments will become apparent from the following description, taken in conjunction with the accompanying drawings, illustrating by way of example the principles of the invention.

It is to be understood that both the foregoing general description and the following detailed description are exemplary and explanatory and are not restrictive of the invention, as claimed.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

One embodiment of a switch structure applied to, for example, a power window switch device will now be described. The switch structure described hereafter is not limited to the power window switch device and may be applied to any switch device.

Figure 1:
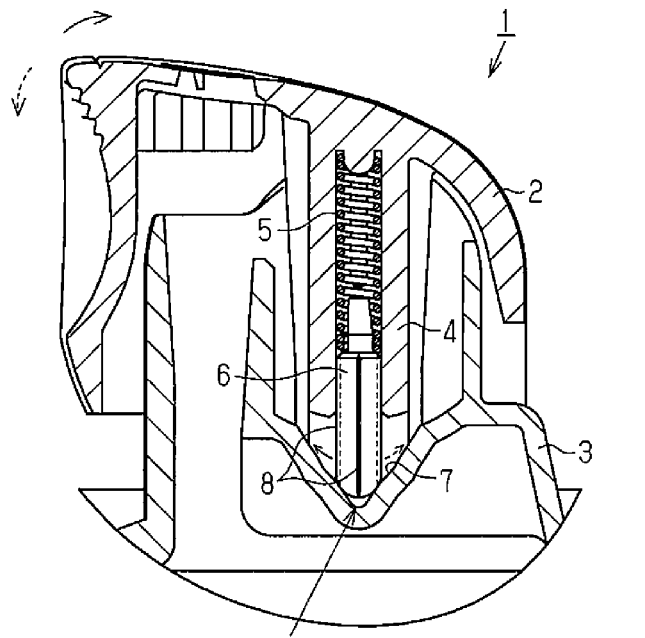
FIG. 1 is a cross-sectional view of a switch structure.

As illustrated in FIG. 1, the switch structure 1 includes a lever 2, which is operable by a user, and a body 3, which is coupled to the lever 2. A holder 4 extends down from the lever 2 toward the body 3. A spring 5 is accommodated in the holder 4. The spring 5 includes a basal end fixed to the inner end of the holder 4 and a distal end coupled to the pusher 6. The basal end of the spring 5 is a fixed end, and the distal end of the spring 5 is a free end. The pusher 6 and the spring 5 are supported by the lever 2 in the holder 4. In the present example, the holder 4 corresponds to a support.

The spring 5 forces the pusher 6 against a detent surface 7 of the body 3. The pusher 6 is initially held at a neutral position illustrated in FIG. 1. The detent surface 7 includes gradually projecting ridges. For example, the detent surface 7 has a V-shaped cross-section including two slopes (right slope and left slope as viewed in FIG. 1). Each slope includes a ridge.

As illustrated by the solid-line arrow in FIG. 1, when the lever 2 is lifted diagonally toward the right, the pusher 6 is moved diagonally in an upper left direction along the left slope of the detent surface 7 from the neutral position. When the pusher 6 moves over the ridge of the left slope, a click is produced and transmitted to the lever 2 so that the user perceives the click. When the lever 2 is released, the pusher 6 returns to the neutral position.

As illustrated by the broken-line arrow in FIG. 1, when the lever 2 is lowered diagonally toward the left, the pusher 6 is moved diagonally in an upper right direction along the right slope of the detent surface 7 from the neutral position. When the pusher 6 moves over the ridge of the right slope, a click is produced and transmitted to the lever 2 so that the user perceives the click. When the lever 2 is released, the pusher 6 returns to the neutral position.

The pusher 6 includes at least two slide surfaces that slide along the lever 2 and the body 3. In the present example, the pusher 6 includes a first slide surface that slides along the body 3 (detent surface 7) and a second slide surface that slides along the lever 2 (holder 4). In this structure, to enable smooth movement (sliding) of the pusher 6, the first slide surface between the pusher 6 and the body 3 (detent surface 7) and the second slide surface between the pusher 6 and the lever 2 (holder 4) are filled with grease (not illustrated). However, as described below, grease application process is not performed at two locations, but performed at one location.

Figures 2A, 2D:
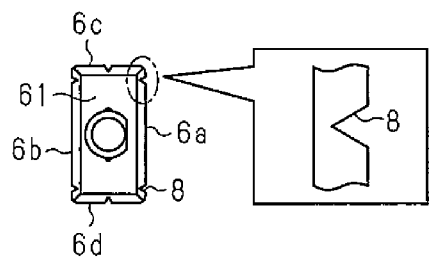
FIG. 2A is a plan view of a pusher and FIG. 2D is a partially enlarged view of FIG. 2A.
Figures 2B, 2C:
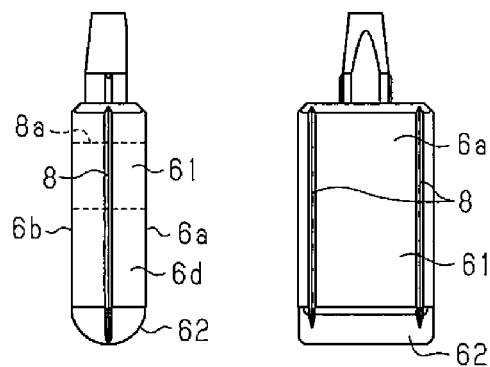
FIG. 2B is a side view of the pusher.
FIG. 2C is a front view of the pusher.

As illustrated in FIGS. 2A to 2C, the pusher 6 substantially has the form of a quadrangular post. That is, the pusher 6 has a rectangular cross-section as viewed in FIG. 2A. However, the pusher 6 is not limited to the form of a quadrangular post. In the present example, the pusher 6 includes a quadrangular post body 61 and a round bottom end 62. The quadrangular post body 61 includes four side surfaces 6a to 6d. The side surfaces 6a and 6b lie along the long sides of the rectangular cross-section, and the side surfaces 6c and 6d lie along the short sides of the rectangular cross-section. Further, the pusher 6 includes one or more grooves 8. The side surfaces 6a to 6d include a total of six grooves 8. Each groove 8 has, for example, a V-shaped cross-section. In the description hereafter, the grooves 8 are referred to as V-shaped grooves 8. Each of the V-shaped grooves 8 extends continuously from the upper end to the vicinity of the lower end in the corresponding one of the side surfaces 6a to 6d. In the present example, the two side surfaces 6a and 6b each include two V-shaped grooves 8, one located near the left end and one located near the right end. The two side surfaces 6c and 6d each include a single V-shaped groove 8 located in the middle portion.

Figure 3:
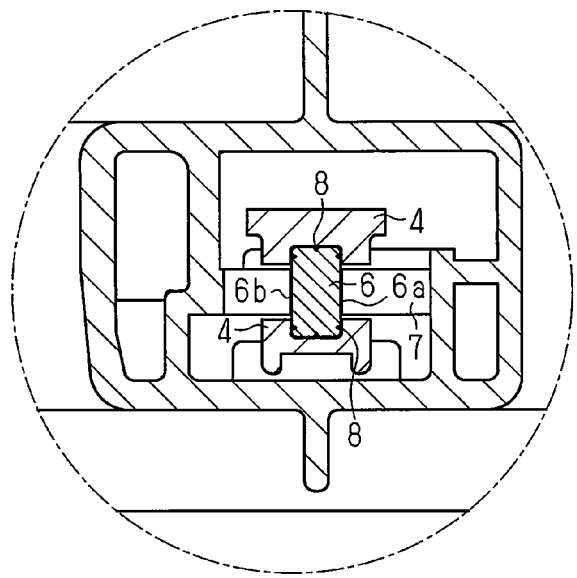
FIG. 3 is a cross-sectional view of the switch structure illustrated in FIG. 1.
Figure 4:
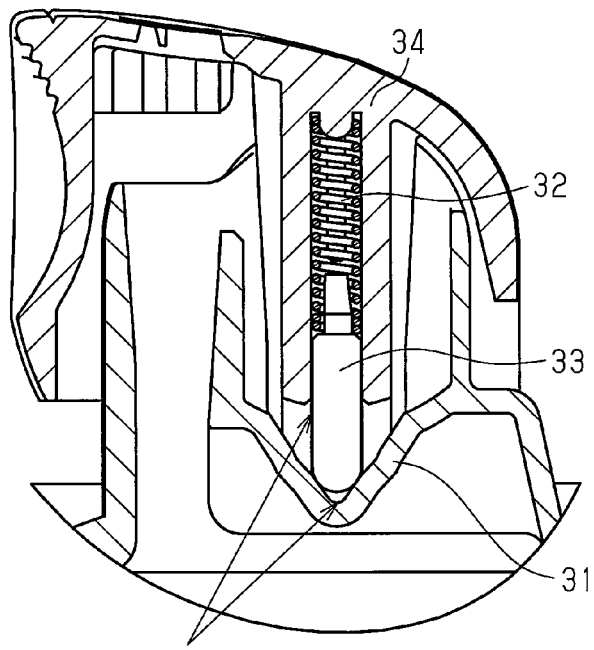
FIG. 4 is a cross-sectional view of a switch structure in a related art.

Each V-shaped groove 8 is separated from the portion where the pusher 6 contacts the detent surface 7 (refer to FIG. 3). For example, in the pusher 6, the middle portion of the round bottom end 62, as viewed in FIG. 2C, is set as the portion where the pusher 6 contacts the detent surface 7. The upper end of each V-shaped groove 8 extends to the portion where the pusher 6 contacts the holder 4 (refer to FIG. 1). Although the lower end of each V-shaped groove 8 is separated from the portion of the pusher 6 that contacts the detent surface 7, the V-shaped groove 8 extends to a portion filled with the grease applied to the contact portion (i.e., first slide surface where pusher 6 slides on detent surface 7). In the present example, although the middle portion of the round bottom end 62 is set as the portion of the pusher 6 that contacts the detent surface 7, the round bottom end 62 may entirely be set as the portion that contacts the detent surface 7 as long as the lower end of each V-shaped groove 8 does not contact the detent surface 7 and be filled with the grease applied to the detent surface 7 when the pusher 6 slides along the detent surface 7. In the present example, the round bottom end 62 of the pusher 6 corresponds to the first slide surface, and the quadrangular post body 61 (side surfaces 6a to 6d) of the pusher 6 corresponds to the second slide surface.

The operation of the switch structure 1 will now be described.

Referring to FIG. 1, grease is applied in advance to the first slide surface where the pusher 6 slides on the body 3 (detent surface 7). In the present embodiment, the grease application process is performed only on the first slide surface. When the grease applied to the first slide surface between the pusher 6 and the detent surface 7 spreads and fills the lower end of each V-shaped groove 8, the grease rises through the V-shaped grooves 8 due to capillary action and reaches the second side surface between the pusher 6 and the lever 2 (holder 4). As a result, in addition to the first slide surface between the pusher 6 and the detent surface 7 where the grease is applied in advance, the grease spreads to the second slide surface between the pusher 6 and the lever 2 (holder 4) where grease application process has not been performed.

The present embodiment has the advantages described below.

(1) The grease applied to the first slide surface between the pusher 6 and the body 3 (detent surface 7) moves through each V-shaped groove 8 and spreads to the second slide surface between the pusher 6 and the lever 2 (holder 4). This results in the grease being applied to each of the first and second side surfaces and enables the pusher 6 to smoothly move relative to the detent surface 7 and the holder 4. Accordingly, there is no need to perform grease application process twice to the switch structure 1 at the two slide surfaces. That is, grease need only be applied to one location. In this manner, the number of locations that undergo grease application process is reduced without affecting the performance of the switch structure 1.

(2) Each V-shaped groove of the pusher 6 draws grease from the slide surface located at a lower position (in the present example, first slide surface between pusher 6 and detent surface 7 of body 3) to the slide surface located at a higher position (in the present example, second slide surface between pusher 6 and holder 4 of lever 2). In this structure, the movement of grease resulting from capillary action is used to reduce the number of times grease application is performed, that is, the number of locations that undergo grease application process.

(3) Each V-shaped groove 8 of the pusher 6 is separated from the portion where the pusher 6 contacts the detent surface 7. In this structure, the V-shaped grooves 8 of the pusher 6 do not decrease the amount (area) of contact between the pusher 6 and the detent surface 7 when the pusher 6 slides on the detent surface 7. Accordingly, the switch structure 1 produces clicks that are sufficiently perceived by the user.

(4) Each V-shaped groove 8 extends to the portion where the pusher 6 is supported by the holder 4 of the lever 2 and is in contact with the holder 4. In this structure, grease is sufficiently spread to substantially the entire second slide surface of the pusher 6 that slides relative to the holder 4 of the lever 2. This allows the pusher 6 to move smoothly while supported in a preferred manner.

(5) The V-shaped grooves 8 of a component (pusher 6) that includes two slide surfaces at different locations allow the grease applied to one slide surface to be drawn to the other slide surface in the same component.

(6) The present example includes a plurality of V-shaped grooves 8 to draw grease from one slide surface to the other slide surface. Thus, even when one of the V-shaped grooves 8 cannot be used, grease may still be drawn by the other V-shaped grooves 8. This maintains the effect of the grease over a long period.

It should be apparent to those skilled in the art that the embodiments may be employed in many other specific forms without departing from the scope of the invention. Particularly, it should be understood that the embodiments may be employed in the following forms.

The grooves 8 of the pusher 6 are not limited to a V-shaped cross-section and may have, for example, a U-shaped cross-section. Moreover, the grooves 8 may have any shape that causes capillary action.

In the foregoing embodiment, the slide surfaces are located at two different locations in the vertical direction, and the grooves 8 extend in the vertical direction. However, the grooves 8 do not necessarily have to extend in the vertical direction. When slide surfaces are located at two different locations in the horizontal direction, grooves may extend in the horizontal direction.

A groove may extend in a diagonal direction in a two-dimensional plane (i.e., same plane).

In a two-dimensional plane, a groove may be formed by combining two of a vertical groove portion that extends in the vertical direction, a horizontal groove portion that extends in the horizontal direction, and a diagonal groove portion that extends in a diagonal direction. Further, for example, as illustrated by the broken lines in FIG. 2B, branch grooves 8a may be branched from each groove 8. The branch grooves 8a are not limited to the shape illustrated in FIG. 2B and may be, for example, T-shaped, cross-shaped, or comb-shaped.

The direction in which the groove 8 extends may be varied three-dimensionally in accordance with the profile of the pusher 6. For example, a groove may extend continuously in different side surfaces (e.g., side surfaces 6a to 6c in FIG. 2A). Alternatively, when the pusher has a curved side surface, a groove may extend in a curved manner along the curved surface. Also in this case, the groove may be branched.

In a continuously extending groove, the number of grease inlets and the number of grease outlets may be the same or different. For example, each groove may be formed so that the number of outlets (e.g., upper ends) is greater than the number of inlets (e.g., lower ends).

The switch structure may include three or more slide surfaces. In this case, one or more grooves may be selected from the grooves described in the above embodiment and modified examples.

When the clicks are obtained in some degree, the grooves 8 of the pusher 6 do not necessarily have to be separated from the portion where the pusher 6 contacts the detent surface 7.

In the above embodiment, the body 3 includes the detent surface 7, and the lever 2 includes the holder 4 that supports the pusher 6 and serves as a support. However, a lever may include a detent surface, and a body may include a support. In this case, the switch structure is configured so that the force of a spring pushes a pusher, which is supported by the support of the body, against the detent surface of the lever.

More than one location may undergo grease application process. For example, when the switch structure includes three or more slide surfaces, grease application process may be performed on two slide surfaces. In this case, grooves may be formed in the pusher so that grease is drawn from the slide surfaces where grease application process is performed to the remaining slide surface so that the grease is spread throughout all of the slide surfaces. This structure also results in smooth sliding of the pusher at every one of the slide surfaces.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to an illustration of the superiority and inferiority of the invention. Although embodiments have been described in detail, it should be understood that various changes, substitutions, and alterations could be made hereto without departing from the scope of the invention.

The invention claimed is:

1. A switch structure comprising:
  a lever operable by a user;
  a body coupled to the lever;
  a support formed in one of the lever and the body;
  a pusher supported by the support;
  a detent surface formed in the other one of the lever and the body to produce a click when the lever is operated; and
  a spring that pushes the pusher against the detent surface, wherein
  the pusher includes at least two slide surfaces that slide on the lever and the body,
  the pusher includes a groove that draws grease from one of the at least two slide surfaces where the grease is applied to another one of the at least two slide surfaces,
  the at least two slide surfaces include
    a first slide surface having a contact portion where the pusher contacts the detent surface, and
    a second slide surface that is continuous with the first slide surface and located at a higher position than the first slide surface in a vertical direction of the switch structure, and
  the groove of the pusher extends continuously from the first slide surface to the second slide surface to draw the grease from, the first slide surface to the second slide surface.

2. The switch structure according to claim 1, wherein the groove of the pusher is located at a position separated from the contact portion where the pusher contacts the detent surface.

3. The switch structure according to claim 1, wherein the groove of the pusher extends to a portion of the pusher that contacts the support when the pusher slides along the support.

4. The switch structure according to claim 1, wherein the groove of the pusher includes a branch groove that branches from the groove of the pusher.

5. The switch structure according to claim 1, wherein the groove of the pusher has a V-shaped cross-section, a U-shaped cross-section, or a shape that causes capillary action.

6. The switch structure according to claim 1, wherein
  the pusher includes a quadrangular post body and a round bottom end; and
  the groove extends from the quadrangular post body to the round bottom end.

7. The switch structure according to claim 6, wherein
  the groove is one of a plurality of grooves that are formed in four side surfaces of the quadrangular post body, and
  each of the four side surfaces includes one or more of the plurality of grooves so that each groove extends in a corresponding side surface.

* * * * *